Aug. 14, 1962  D. E. SINGELMANN  3,049,081

PUMP SEAL

Filed April 27, 1959

INVENTOR:
DIETRICH E. SINGELMANN
BY:
Beau, Brooks, Buckley & Beau,
ATTORNEYS.

United States Patent Office 3,049,081
Patented Aug. 14, 1962

3,049,081
PUMP SEAL
Dietrich E. Singelmann, Buffalo, N.Y., assignor, by mesne assignments, to Bell Aerospace Corporation, Wheatfield, N.Y., a corporation of Delaware
Filed Apr. 27, 1959, Ser. No. 809,586
3 Claims. (Cl. 103—101)

This invention relates to improvements in combination dynamic and static pressure seals for preventing leakage of fluid around high speed rotating parts of machines such as shafts in pumps, turbines, and the like; and more particularly to liquid seals of the type wherein a contact seal is employed to prevent leakage under idle or low speed conditions and wherein a centrifugally generated liquid seal is employed to prevent leakage after the machine has reached its high speed operating condition.

Liquid seals of the kind referred to are known as combination static-dynamic seals and are usually employed for sealing purposes where under high speed operating conditions seal frictions must be reduced to a minimum.

An object of the present invention is to provide an improved combination liquid and contact seal as hereinbefore mentioned which is adapted to seal off higher suction pressures than in the case of prior seal designs.

Another object of the invention is to provide improved means for keeping the dynamic seal component filled with liquid while at the same time providing a constant flow of cooling liquid through the centrifugal seal component.

Another object is to provide in a pump as aforesaid an improved air bleed off arrangement whereby air entering the pump during standstill may be disposed of with improved facility upon restarting the pump operation, whereby the pump is readily brought up to optimum pressure performance.

Figure 1:
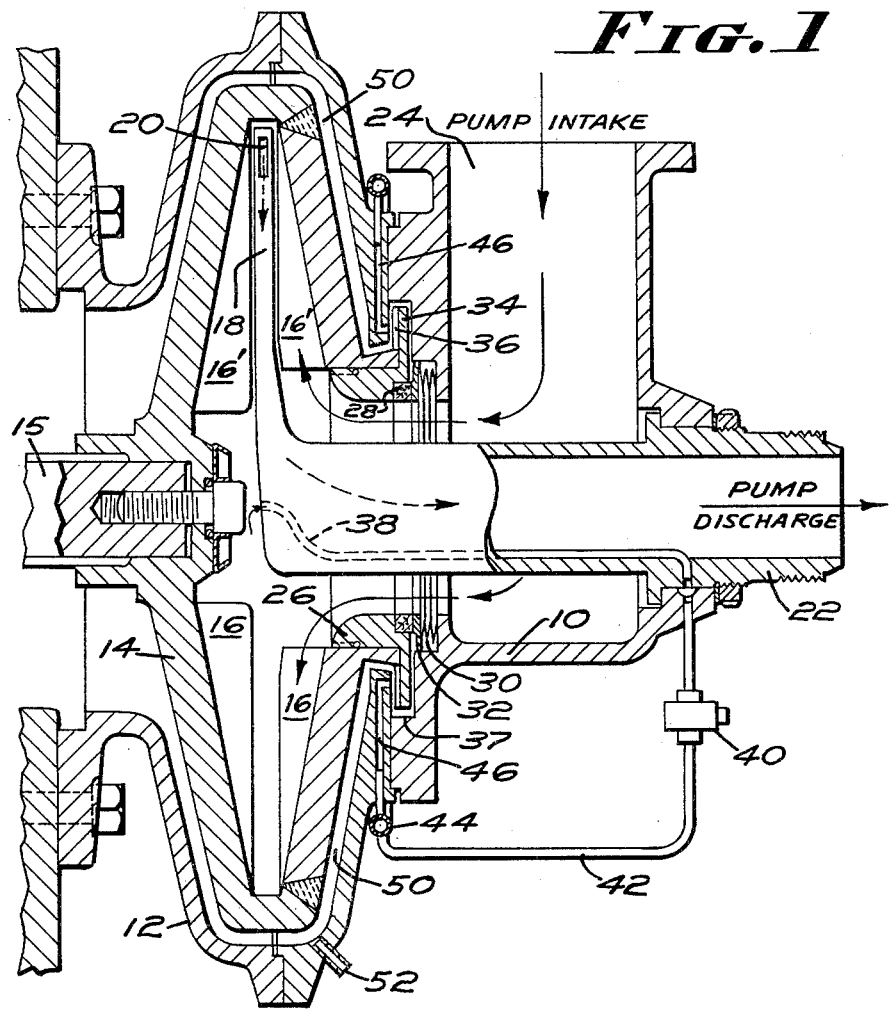
Figure 2:
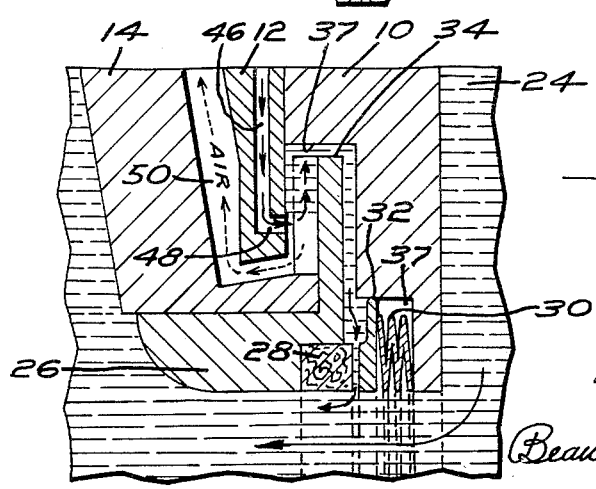

Other objects and advantages of the invention will be apparent from the following specification wherein:

FIG. 1 is a vertical section through a high speed centrifugal pump embodying a seal of the present invention, showing the parts in idle or slow speed static-seal operating condition; and FIG. 2 is a fragmentary sectional view on enlarged scale, of a portion of FIG. 1, showing the seal component of the pump in high speed or centrifugal-sealed condition.

As shown by way of example herein, the machine to be sealed is a centrifugal pump comprising a stationary housing consisting of housing parts 10, 12, inside of which is rotatably mounted an impeller casing 14 as by means of a drive shaft 15. The impeller 14 is formed with internal vanes 16 which are shaped to clear the radial arm of a liquid outlet "spoon" 18 when the impeller rotates within the housing portion 12 of the machine. The spoon 18 includes a "ram" inlet opening 20 and is supported by a stationary fluid delivery conduit portion 22 of the pump. Thus, rotation of the impeller by the shaft 15 will cause fluid to be drawn into the pump through the inlet conduit portion 24 thereof, and then to be rammed into the spoon port 20 and then delivered from the pump through the conduit portion 22.

The seal between the impeller casing 14 and the housing 10—12 includes a collar 26 keyed to the impeller and carrying a contact seal annulus 28. The housing part 10 mounts a stationary sylphon bellows type diaphragm 30 terminating at its free end in a seal contact ring 32. The resiliency and dimensional characteristics of the diaphragm 30 are such that when the pump is standing at idle or slow speed the ring 32 contacts the annulus 28 and provides an efficient "static" seal against leakage of liquid from the pump. To provide a frictionless seal for the device when the pump is running at higher speed, the collar 26 is provided with an impeller flange 34 carrying at one side thereof radial vanes 36 disposed in an annular recess 37 formed in the stationary housing 10. By virtue of this arrangement, as the pump shaft speed increases the liquid present in the recess is flung radially outward along the left hand side of the flange 34 by the centrifugal action of the vanes 36 against the outer end wall of the recess 37 and over and around the edge of the flange 34 and thence inwardly again alongside the right hand face of the flange 34 which carries no vanes corresponding to those on the left side of the flange. The liquid so propelled by the vanes 36 enters the chamber surrounding the bellows 30 under such pressure as to act upon the bellows and against the flange 32 so as to force it to the right as shown in the drawing, against the resiliency force of the bellows structure and the liquid pressure inside of the bellows. Thus the sealing ring 32 is caused to move clear of the sealing annulus 28 (as shown in FIG. 2) thereby avoiding frictional rubbing contact therebetween; while the centrifugally thrown liquid in the chamber 37 "seals" the pump against leakage.

As shown in FIG. 1, a conduit 38 having its intake opening into the interior of the pump casing at the center of rotation thereof is connected through valve 40 and conduit 42 into a manifold ring 44 which encircles the area of the dynamic seal and communicates with the interior of the chamber 37 by means of passageways 46 disposed radially around the unit and entering the dynamic seal chamber at points 48. These points 48 being radially inside of the direction of throw of the impeller 34, will deliver into a reduced pressure zone. Hence a constant circulatory flow of liquid will be established from the center of the pump through the conduits 38, 42, 44; the passageways 46; the dynamic seal chamber 37; and thence back into the center of the pump; the rate of circulatory flow being controlled by manual setting of the valve 40. Any air present inside of the pump, such as incidental to a previous shut down, will be entrained with the circulating liquid, and will be immediately drawn out of the pump through the circulating system referred to whenever the pump is restarted. Air entrained in the liquid issuing from the ports 48 into the impeller chamber is released therein to flow radially inwardly and thence out of the channel 50, whereupon it gains access to the ambient atmosphere as through the vent port 52 which is disposed at the base of the casing to drain off any air or liquids such as might gain access thereto incidental to operation of the pump.

Thus it will be appreciated that the pump seal arrangement of the present invention provides optimum static and dynamic sealing performance, as well as an improved air bleed-off and liquid circulation arrangement through the dynamic seal component which maintains the latter at low temperature thus avoiding "boiling" therein of the liquid being handled; and that although only one form of the invention has been illustrated and described in detail hereinabove, it will be understood that various changes may be made therein without departing from the spirit of the invention or the scope of the following claims.

I claim:
1. In a pump having a housing member, an impeller casing member disposed within said housing and having a clearance space between the housing and the casing, a drive shaft connected to said impeller casing for rotating the same, said impeller casing having an inlet opening and said housing having an inlet conduit leading into said impeller casing through said inlet opening, a combination static-dynamic pressure seal interposed between said housing member and said impeller casing member around the inlet passage sealing the clearance space from the inlet opening, said seal comprising a contact seal annulus rigid with one of said members, a sylphon bellows fixed at one end to the other of said members, a seal contact ring fixed to the other end of said bellows and normally urged thereby into face-to-face contact with said contact seal annulus to provide a static seal thereat, said impeller casing having an impeller flange rigid therewith, said housing having a chamber receiving said impeller flange, said impeller flange having radial vanes on that side thereof opposite the interface between said contact seal annulus and said seal contact ring and said chamber being in communication with such interface, said housing having a passageway leading to said chamber in the region of said vanes, conduit means connecting the interior of said impeller casing with said passageway to circulate fluid from the impeller casing to said chamber and thence to said interface to separate said contact seal annulus and said seal contact ring allowing fluid to bleed through the clearance space at this point to said inlet of the pump to provide a dynamic seal when the impeller casing is operatively rotated, and said clearance space communicating said chamber with the interior of said housing radially inwardly of said passageway to provide an air bleed-off.

2. The pump as defined in claim 1 wherein a valve is interposed in said conduit means to regulate flow of fluid therethrough.

3. The pump as defined in claim 1 including a stationary discharge conduit member extending into said impeller casing through the inlet opening therein, a liquid outlet spoon fixed to said discharge conduit member, said conduit means including a portion extending into said impeller casing through said discharge conduit member.

References Cited in the file of this patent

UNITED STATES PATENTS

| | | |
|---|---|---|
| 1,932,214 | Hornschuch | Oct. 24, 1933 |
| 2,646,999 | Barske | July 28, 1953 |
| 2,781,209 | Jacobs | Feb. 12, 1957 |
| 2,875,696 | Von Zborowski | Mar. 3, 1959 |

FOREIGN PATENTS

| | | |
|---|---|---|
| 34,133 | Sweden | Jan. 2, 1913 |
| 228,945 | Great Britain | May 21, 1925 |